United States Patent
Miki

(10) Patent No.: US 9,595,712 B2
(45) Date of Patent: Mar. 14, 2017

(54) ACTIVE MATERIAL POWDER AND METHOD OF PRODUCING THE SAME

(71) Applicant: TOYOTA JIDOSHA KABUSHIKI KAISHA, Toyota-shi, Aichi-ken (JP)

(72) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 14/677,230

(22) Filed: Apr. 2, 2015

(65) Prior Publication Data

US 2015/0287985 A1  Oct. 8, 2015

(30) Foreign Application Priority Data

Apr. 4, 2014  (JP) .................................. 2014-077426

(51) Int. Cl.
*H01M 10/0525* (2010.01)
*H01M 4/485* (2010.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
CPC ......... H01M 10/0525; H01M 10/0562; H01M 2004/021; H01M 2300/0068; H01M 4/366;
(Continued)

(56) References Cited

U.S. PATENT DOCUMENTS

2009/0081554 A1  3/2009  Takada et al.
2011/0027661 A1  2/2011  Okazaki et al.
(Continued)

FOREIGN PATENT DOCUMENTS

| JP | 2009-193940 A | 8/2009 |
| KR | 10-2013-0076810 A | 7/2013 |
| WO | 2007/004590 A1 | 1/2007 |

OTHER PUBLICATIONS

N. Ohta, K. Takada, I. Sakaguchi, L. Zhang, R. Ma, K. Fukuda, M. Osada, T. Sasaki. LiNbO3-coated LiCoO2 as cathode material for all solid-state lithium secondary batteries, Electrochem. Comm. 2007, 9, 1486-1490.*

*Primary Examiner* — Carlos Barcena
(74) *Attorney, Agent, or Firm* — Oliff PLC

(57) ABSTRACT

An active material powder includes an active material particle, and a coating layer. The coating layer contains $LiNbO_3$ and has pores. When a total volume of pores having a diameter of 2 nm to 7 nm and a total volume of pores having a diameter of 2 nm to 200 nm are respectively represented by V1 and V2, V1/V2 is 0.185 or less. In addition, a method of producing an active material powder includes: obtaining, with a fluidized bed granulating-coating machine, a powder including an active material particle to which an alkoxide compound is attached; and promoting hydrolysis of the alkoxide compound by exposing the powder to a humidified inert gas atmosphere. An intake-gas temperature of the fluidized bed granulating-coating machine is 100° C. or higher. A time during which the powder is exposed to the humidified inert gas atmosphere is four hours or longer.

4 Claims, 5 Drawing Sheets

(51) Int. Cl.
*H01M 4/36* (2006.01)
*H01M 4/505* (2010.01)
*H01M 4/525* (2010.01)
*H01M 4/58* (2010.01)
*H01M 10/0562* (2010.01)
*H01M 4/62* (2006.01)
*H01M 4/02* (2006.01)

(52) U.S. Cl.
CPC ..... H01M 4/5825 (2013.01); H01M 10/0562 (2013.01); *H01M 4/621* (2013.01); *H01M 4/625* (2013.01); *H01M 10/0525* (2013.01); *H01M 2004/021* (2013.01); *H01M 2300/0068* (2013.01)

(58) Field of Classification Search
CPC ...... H01M 4/485; H01M 4/505; H01M 4/525; H01M 4/5825; H01M 4/621; H01M 4/625
See application file for complete search history.

(56) References Cited

U.S. PATENT DOCUMENTS

| | | |
|---|---|---|
| 2013/0059209 A1 | 3/2013 | Ota et al. |
| 2013/0171526 A1* | 7/2013 | Miki ................. H01M 4/0471 429/231.1 |

\* cited by examiner

ACTIVE MATERIAL POWDER AND METHOD OF PRODUCING THE SAME

INCORPORATION BY REFERENCE

The disclosure of Japanese Patent Application No. 2014-077426 filed on Apr. 4, 2014 including the specification, drawings and abstract is incorporated herein by reference in its entirety.

BACKGROUND OF THE INVENTION

1. Field of the Invention

The present invention relates to active material powder including an active material and a coating layer attached to a surface of the active material, and a method of producing the same.

2. Description of Related Art

A metal ion secondary battery (for example, a lithium ion secondary battery; hereinafter also referred to as "all-solid-state battery") including a solid electrolyte layer in which a flame-retardant solid electrolyte is used has advantageous effects in that, for example, a system for securing safety can be easily simplified.

As a technique relating to such an all-solid-state battery, for example,

International Publication WO 2007/004590 discloses a positive electrode active material having a surface coated with a lithium ion-conducting oxide. In addition, International Publication WO 2007/004590 discloses a method of forming a $LiNbO_3$ layer on a surface of a $LiCoO_2$ powder particle, the method including: coating a surface of a $LiCoO_2$ powder particle with alkoxide by spraying an alkoxide solution thereto by using $LiCoO_2$ powder as a fluidized bed in a tumbling fluidized bed granulating-coating machine; hydrolyzing the particle with moisture in air; and firing the particle.

In an active material powder produced using the technique disclosed in International Publication WO 2007/004590 which includes an active material particle and a layer (coating layer) coating a surface of the active material particle, the thickness of the coating layer formed on the surface of the active material particle is uneven. As a result, a lithium ion secondary battery using this active material powder has a problem in that it is difficult to reduce the reaction resistance.

SUMMARY OF THE INVENTION

The invention has been made to provide an active material powder capable of reducing the resistance and the unevenness in the thickness of a coating layer; and a method of producing the same.

As a result of earnest investigation, the present inventors have found that it is possible to reduce the reaction resistance of a lithium ion secondary battery and to make the unevenness in the thickness of a coating layer small by applying an active material powder in which $V1/V2$ is a predetermined value or less to the lithium ion secondary battery. Here, $V1$ and $V2$ represents a total volume of pores having a diameter of 2 nm to 7 nm and a total volume of pores having a diameter of 2 nm to 200 nm, respectively. The total volumes are specified by observing an active material powder produced in the process of forming a coating layer on a surface of the active material particle. Further, as a result of earnest investigation, the present inventors have found that, by controlling conditions including the temperature, at which a solution attached to a surface of an active material particle is dried to form a coating layer, and the time, during which hydrolysis is promoted, during the production of an active material powder, the produced active material powder can obtain the following advantageous effects: the reaction resistance of a lithium ion secondary battery using the active material powder can be reduced; and the unevenness in the thickness of the coating layer can be reduced. The invention has been made based on these findings.

An active material powder according a first aspect of the invention includes an active material particle and a coating layer. The coating layer is attached to a surface of the active material particle, contains $LiNbO_3$, and has pores. When a total volume of pores having a diameter of 2 nm to 7 nm among the pores is represented by $V1$, and when a total volume of pores having a diameter of 2 nm to 200 nm among the pores is represented by $V2$, $V1/V2$ is 0.185 or less.

In the first aspect of the invention, $V1$ and $V2$ can be specified, for example, by causing gas to be adsorbed on the active material powder and then analyzing the gas-adsorbed active material powder using the Barrett-Joyner-Halenda method (hereinafter, referred to as "BJH method"), the Cranston-Inkley method (CI method), the Dollimore-Heal method (DH method), or the like. $V1$ corresponds to the total volume of pores which have a diameter of 2 nm to 7 nm and are present in the coating layer. Therefore, adjusting $V1/V2$ to be 0.185 or less represents decreasing the number of pores present in the coating layer. By decreasing the number of pores present in the coating layer, the resistance can be reduced during the movement of lithium ions in the coating layer. Thus, the reaction resistance of a lithium ion secondary battery using the active material powder can be reduced. In addition, by adjusting $V1/V2$ to be 0.185 or less, the unevenness in the thickness of the coating layer can be reduced. Accordingly, according to the first aspect of the invention, an active material powder capable of reducing the resistance and the unevenness in the thickness of a coating layer can be provided. In the first aspect of the invention, "the unevenness in the thickness of the coating layer being reduced (the unevenness in the thickness of the coating layer being small)" represents that a variation coefficient (=standard deviation divided by average thickness) is a predetermined value or less. The variation coefficient is specified using an average thickness and a standard deviation of the coating layer. The average thickness and the standard deviation are obtained by measuring the thickness of the coating layer at plural positions of plural active material powder particles.

A method of producing an active material powder according to a second aspect of the invention includes: obtaining a powder including an active material particle and a coating layer precursor attached to a surface of the active material particle by attaching an alkoxide solution to the surface of the active material particle and by concurrently drying the alkoxide solution attached to the surface of the active material particle with a fluidized bed granulating-coating machine, the alkoxide solution containing an alkoxide compound; promoting hydrolysis of the alkoxide compound by exposing the powder to a humidified inert gas atmosphere; and forming a coating layer on the surface of the active material particle by heating the powder after the promotion of the hydrolysis. An intake-gas temperature of the fluidized bed granulating-coating machine is 100° C. or higher. A time during which the powder is exposed to the humidified inert gas atmosphere is four hours or longer.

By increasing the intake-gas temperature to be 100° C. or higher, the drying rate of the alkoxide solution attached to the surface of the active material particle can be improved. Therefore, the unevenness in the thickness of the coating layer formed on the surface of the active material particle can be reduced. In addition, by exposing the powder, which includes an active material particle and a coating layer precursor attached to a surface of the active material particle, to the humidified inert gas atmosphere for four hours or longer, the purity of the alkoxide compound contained in the coating layer precursor can be improved. As a result, the lithium ion conductivity resistance of the coating layer can be reduced. The reaction resistance of a lithium ion secondary battery using the active material powder can be reduced. Accordingly, according to the second aspect of the invention, a method of producing an active material powder capable of reducing the resistance and the unevenness in the thickness of a coating layer can be provided.

According to the first and second aspects of the invention, an active material powder capable of reducing the resistance and the unevenness in the thickness of a coating layer; and a method of producing the same can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In a lithium ion secondary battery using an active material powder produced with a method of the related art which includes an active material particle and a coating layer attached to a surface of the active material powder, the reaction resistance is high. As a result of investigating the reason, it was found that the above phenomenon was caused due to the unevenness in the thickness of the coating layer formed on the surface of the active material particle. As a result of earnest investigation, the present inventors thought that one of the causes for the unevenness in the thickness of the coating layer was the slow drying rate of the alkoxide solution attached to the surface of the active material particle, and thus set the temperature at which the alkoxide solution was dried to be 100° C. or higher. As a result, the unevenness in the thickness of the coating layer was able to be reduced. Further, as a result of earnest investigation, the present inventors thought that the reaction resistance of a lithium ion secondary battery using an active material powder could be reduced by improving the purity of an alkoxide compound constituting the coating layer, and thus set the time of performing a hydrolysis promoting treatment to be four hours or longer. As a result, the unevenness in the thickness of the coating layer was reduced, and an active material powder having improved purity of the alkoxide compound was produced. As a result of measuring the reaction resistance of a lithium ion secondary battery using this active material powder, it was found that the reaction resistance was reduced as compared to that in the related art. In addition, in the active material powder in which the reaction resistance and the unevenness in the thickness of the coating layer were reduced, V1/V2 was 0.185 or less. V1 and V2 represent a total volume of pores having a diameter of 2 nm to 7 nm and a total volume of pores having a diameter of 2 nm to 200 nm, respectively. The total volumes are specified by causing gas to be adsorbed on the active material powder and then analyzing the gas-adsorbed active material powder using the BJH method. On the other hand, in the active material powder produced using the method of the related art, V1/V2 was more than 0.185 when measured using the same method as described above. Accordingly, it is considered that, by using the active material powder in which V1/V2 is 0.185 or less, an active material powder capable of reducing the resistance and the unevenness in the thickness of a coating layer can be provided. The invention has completed based on these findings.

Hereinafter, an embodiment of the invention will be described with reference to the drawings. Embodiments described below are examples of the invention, and the embodiments according to the invention are not limited to configurations described below.

1. Active Material Powder

Figure 1:
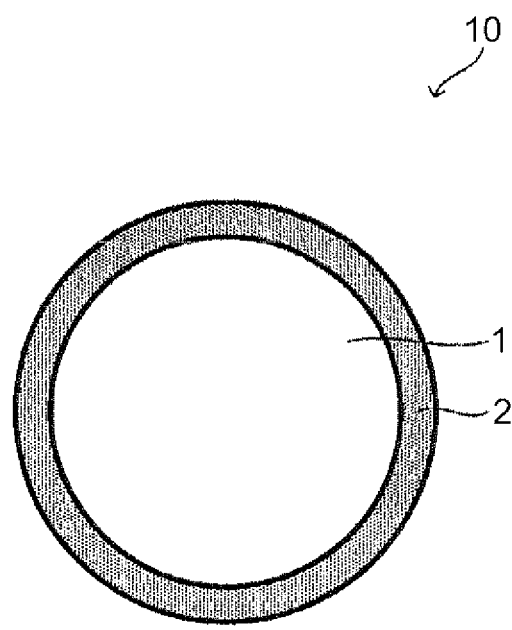
FIG. 1 is a diagram illustrating an active material powder 10.

FIG. 1 is a diagram illustrating an active material powder 10 according to an embodiment of the invention. For convenience of description, FIG. 1 illustrates a configuration in which a coating layer 2 containing $LiNbO_3$ is attached (coated) to a surface of one active material particle 1. However, the active material powder according to the embodiment of the invention is not limited to this configuration. In the active material powder according to the embodiment of the invention, the coating layer containing $LiNbO_3$ may be attached (coated) to a surface of an active material particle having a secondary particle form in which plural active material particles aggregate.

The active material powder 10 illustrated in FIG. 1 includes an active material particle 1 and a coating layer 2 containing $LiNbO_3$ which is attached to a surface of the active material particle 1. In the active material powder 10, a ratio V1/V2 is 0.185 or less, in which V1 and V2 represent a total volume of pores having a diameter of 2 nm to 7 nm and a total volume of pores having a diameter of 2 nm to 200 nm, respectively, which are specified by causing nitrogen gas to be adsorbed on the surface on the active material powder and then analyzing the gas-adsorbed active material powder using the BH method. In the active material powder 10 in which V1/V2 is 0.185 or less, the unevenness in the thickness of the coating layer 2 is small, and the reaction resistance of a lithium ion secondary battery using the active material powder 10 can be reduced. Here, it is considered that V1 corresponds to the total volume of pores present in relatively thin portions of the coating layer 2 in which the unevenness in thickness is small. On the other hand, V2 is the volume value in consideration of not only the pores of V1 but also pores present in relatively thick portions of the coating layer 2 which are formed on surface portions recessed due to contact between adjacent active material powder particles. Accordingly, V1/V2 being 0.185 or less represents that the unevenness in thickness is small, and thus the number of pores present in the thin portions of the coating layer 2 is small. Here, when pores are present in the coating layer 2 where lithium ions move, it is necessary that the lithium ions avoid the pores in order to move. Therefore, the lithium ion conductivity resistance is likely to increase, and thus the reaction resistance of a lithium ion secondary battery is likely to increase. On the other hand, in the active material powder 10 according to the embodiment of the invention, the number of pores present in the coating layer 2 is fewer than that of the active material powder of the related art. Therefore, it is considered that the lithium ion conductivity resistance is likely to be reduced, and thus the resistance of a lithium ion secondary battery can be reduced. Such an active material powder 10 can be produced using a method of producing an active material powder described below.

In the active material powder 10 according to the embodiment of the invention, the above-described problems are solved by suppressing the unevenness in the thickness of the coating layer 2 and reducing the number of pores present in the coating layer 2. Accordingly, the active material particle 1 having a surface to which the coating layer 2 is attached is not limited to materials whose effects were verified in Examples described below, and materials which can be used as an electrode active material in a lithium ion secondary battery can be appropriately used. Examples of the materials include $LiCoO_2$, $NiCoO_2$, $LiNi_{1/3}Co_{1/3}Mn_{1/3}O_2$, $LiMn_2O_4$, a different element-substituted Li—Mn spinel represented by $Li_{i+x}Mn_{2-x-y}M_yM_yO_4$ (wherein $0 \leq x+y \leq 2$; M represents at least one element selected from Al, Mg, Co, Fe, Ni, and Zn), lithium titanate (oxide containing Li and Ti; for example, $Li_4Ti_5O_{12}$), lithium metal phosphate ($LiMPO_4$; M represents at least one element selected from Fe, Mn, Co, and Ni), transition metal oxide ($V_2O_5$, $MoO_3$), $TiS_2$, carbon materials such as graphite or hard carbon, LiCoN, $SiO_2$, $Li_2SiO_3$, $Li_4SiO_4$, lithium metal (Li), lithium alloys (LiSn, LiSi, LiAl, LiGe, LiSb, LiP), lithium-storable intermetallic compounds (for example, $Mg_2Sn$, $Mg_2Ge$, $Mg_2Sb$, $Cu_3Sb$), and derivatives thereof. In a lithium ion secondary battery using the active material powder according to the embodiment of the invention, two materials having different potentials (charge-discharge potentials) at which lithium ions are stored and released are selected from among the above-described exemplary materials. Among the two selected materials, a material having a higher potential can be used as a positive electrode active material, and a material having a lower potential can be used as a negative electrode active material. As a result, a lithium ion secondary battery having an arbitrary potential can be constructed.

For example, the active material particle 1 may be in the form of a particle, and it is preferable that the particle is circular or elliptical. In addition, the average particle size of the active material particle 1 is, for example, preferably in a range of 0.1 μm to 50 μm.

In addition, in the embodiment of the invention, the configuration of the coating layer 2 is not particularly limited as long as it contains $LiNbO_3$ and satisfies V1/V2≤0.185. The average thickness of the coating layer 2 is not particularly limited as long as a reaction between the active material particle and a solid electrolyte material can be suppressed when the active material powder 10 is used in an all-solid-state battery.

For example, the average thickness of the coating layer 2 is, for example, preferably in a range of 1 nm to 500 nm and more preferably in a range of 2 nm to 100 nm. When the coating layer is excessively thick, the ion conductivity and the electron conductivity may decrease. On the other hand, when the coating layer is excessively thin, the active material particle and a solid electrolyte material may react with each other. The thickness of the coating layer 2 can be measured, for example, by an observation (for example, n≤100) using a transmission electron microscope (TEM).

In addition, in order to suppress an increase in interfacial resistance, it is preferable that the coverage of the coating layer 2 on the surface of the active material particle 1 is high. Specifically, the coverage is preferably 50% or higher and more preferably 80% or higher. In addition, it is preferable that the coating layer 2 coats the entire surface of the active material particle 1. The coverage of the coating layer 2 can be measured, for example, using a transmission electron microscope (TEM) or X-ray photoelectron spectroscopy (XPS).

When the active material powder 10 is used in an all-solid-state battery, an increase in the interfacial resistance between the active material powder 10 and a solid electrolyte material can be suppressed. Examples of the all-solid-state battery include a lithium all-solid-state battery, a sodium all-solid-state battery, a magnesium all-solid-state battery, and a calcium all-solid-state battery. Among these, a lithium all-solid-state battery or a sodium all-solid-state battery is preferably used, and a lithium all-solid-state battery is particularly preferably used. In addition, it is preferable that the lithium all-solid-state battery is an all-solid-state battery using a sulfide solid electrolyte material because the sulfide solid electrolyte material has superior ion conductivity. In addition, the sulfide solid electrolyte material is highly reactive and is likely to react with the active material particle so as to form a high-resistance layer. Accordingly, by using the active material powder 10 according to the embodiment of the invention in combination with the sulfide solid electrolyte material, the formation of a high-resistance layer can be suitably suppressed. In addition, the all-solid-state battery may be a primary battery or a secondary battery. However, the all-solid-state battery is preferably a secondary battery because it can be repeatedly charged and discharged and is used as, for example, a vehicle-mounted battery. In addition, examples of the type of the all-solid-state battery include a coin type, a laminate type, a cylindrical type, and a square type.

2. Lithium Ion Secondary Battery (All-Solid-State Battery)

Figure 2:
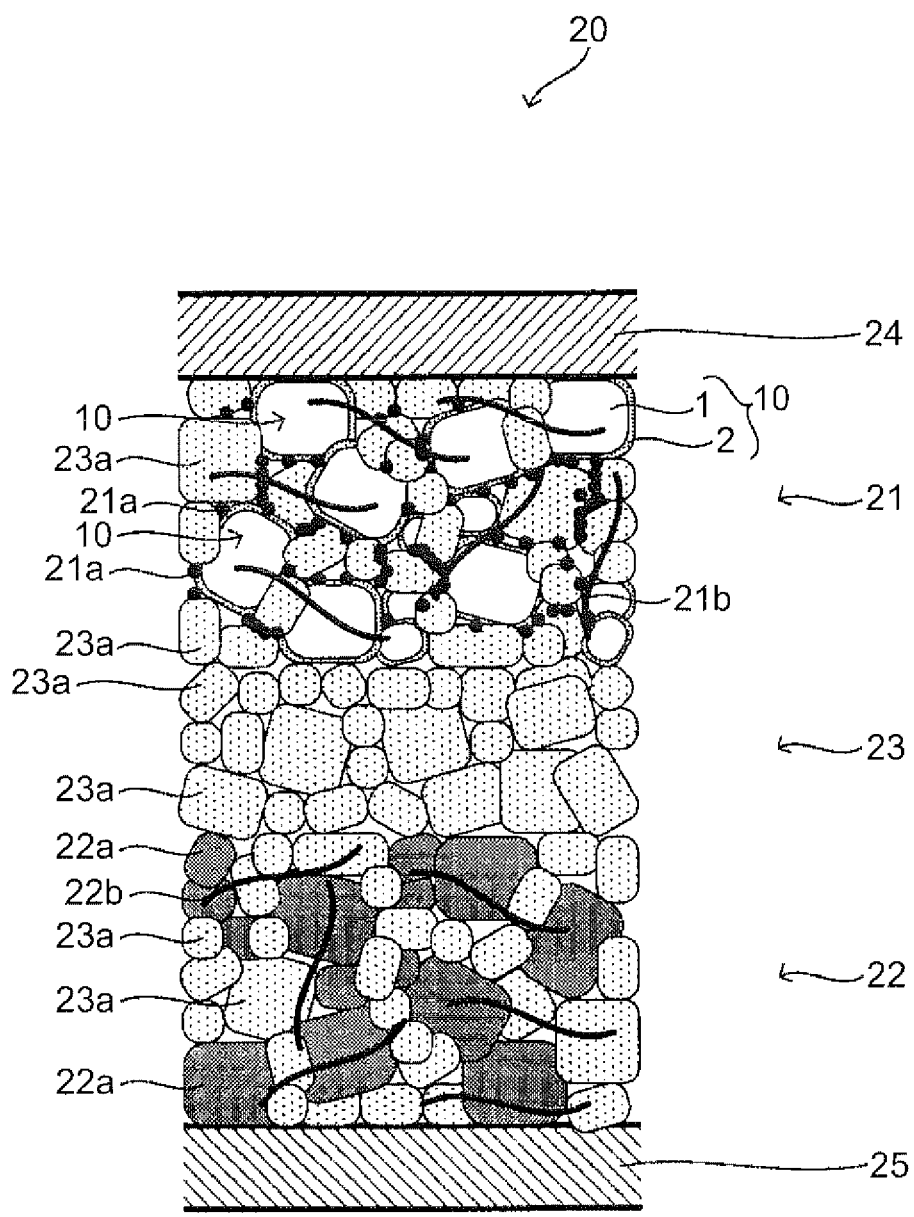
FIG. 2 is a diagram illustrating an all-solid-state battery 20.

Next, an all-solid-state battery 20 constructed using the active material powder 10 according to the embodiment of the invention (all-solid-state battery according to an embodiment of the invention) will be described. FIG. 2 is a diagram illustrating the all-solid-state battery 20. In FIG. 2, the all-solid-state battery 20 is simplified, and a battery case or the like is not illustrated. As in the case of the active material powder 10 illustrated in FIG. 1, a material including an active material particle and a coating layer containing $LiNbO_3$, which is attached to the surface of the active material particle, is represented by reference numeral 10 in FIG. 2, and the description thereof will be appropriately omitted.

As illustrated in FIG. 2, the all-solid-state battery 20 includes a positive electrode 21, a negative electrode 22, a solid electrolyte layer 23 which is interposed between the electrodes, a positive electrode current collector 24 which is connected to the positive electrode 21, and a negative electrode current collector 25 which is connected to the negative electrode 22. The positive electrode 21 includes the active material powder 10 according to the embodiment of the invention, a sulfide solid electrolyte 23a, a conductive additive 21a, and a binder 21b. The active material powder 10 includes the active material particle 1 (hereinafter, also referred to as "positive electrode active material 1") and the coating layer 2 containing $LiNbO_3$ which is attached to the surface of the positive electrode active material 1. In addition, the negative electrode 22 includes a negative electrode active material 22a, the sulfide solid electrolyte 23a, and a binder 22b. In addition, the solid electrolyte layer 23 includes the sulfide solid electrolyte 23a. In the all-solid-state battery 20, the positive electrode active material 1 is $LiNi_{1/3}Co_{1/3}Mn_{1/3}O_2$, and the negative electrode active material 22a is graphite.

In this way, the all-solid-state battery 20 includes the positive electrode 21 containing the active material powder 10 according to the embodiment of the invention.

As described above, with the active material powder 10 according to the embodiment of the invention, the resistance of a lithium ion secondary battery can be reduced. Accordingly, with the configuration in which the positive electrode 21 containing the active material powder 10 is provided, the all-solid-state battery 20 capable of reducing the resistance can be provided.

Here, the positive electrode 21 can be prepared, for example, through the following steps. The active material powder 10, the sulfide solid electrolyte 23a, the conductive additive 21a, and the binder 21b are poured into a solvent, and this solution is dispersed using an ultrasonic homogenizer or the like. As a result, a slurry-like positive electrode composition is prepared. A surface of the positive electrode current collector 24 is coated with this slurry-like positive electrode composition and then is dried. In addition, the negative electrode 22 can be prepared through the following steps. The negative electrode active material 22a, the sulfide solid electrolyte 23a, and the binder 22b are poured into a solvent, and this solution is dispersed using an ultrasonic homogenizer or the like. As a result, a slurry-like negative electrode composition is prepared. A surface of the negative electrode current collector 25 is coated with this slurry-like negative electrode composition and then is dried. In addition, the solid electrolyte layer 23 can be formed, for example, through a step of pressing the sulfide solid electrolyte 23a. In this way, once the positive electrode 21, the negative electrode 22, and the solid electrolyte layer 23 are prepared, the negative electrode current collector 25, the negative electrode 22, the solid electrolyte layer 23, the positive electrode 21, and the positive electrode current collector 24 are laminated in an inert gas atmosphere (for example, an argon atmosphere, a nitrogen atmosphere, or a helium atmosphere; hereinafter, the same shall be applied) to form a laminate such that these elements are arranged in this order from one side to the other side as illustrated in FIG. 2. Next, for example, a step of pressing the laminate is performed, and thus the all-solid-state battery 20 can be manufactured.

In the all-solid-state battery according to the embodiment of the invention, the positive electrode active material can be appropriately selected from the materials described above as the specific examples of the active material particle 1 in "1. Active Material Powder". The negative electrode active material can be appropriately selected from the materials described above as the specific examples of the active material particle 1 in "1. Active Material Powder" such that the all-solid-state battery 20 having a target voltage can be configured by combining the negative electrode active material with the positive electrode active material.

The positive electrode active material can have, for example, a particle shape or a thin film shape. An average particle size ($D_{50}$) of the positive electrode active material is, for example, preferably 1 nm to 100 μm and more preferably 10 nm to 30 μm. In addition, the content of the positive electrode active material in the positive electrode is not particularly limited, but is, for example, preferably 40% to 99% by mass %.

In addition, as described above, in the all-solid-state battery according to the embodiment of the invention, the positive electrode and the negative electrode may optionally further include a well-known solid electrolyte which can be used in a lithium ion secondary battery. Examples of the solid electrolyte which can be included in the positive electrode and the negative electrode include $Li_2S-SiS_2$, $LiI-Li_2S-SiS_2$, $LiI—Li_2O—Li_2S—P_2S_5$, $LiI—Li_2S—P_2O_5$, $LiI—Li_3PO_4—P_2S_5$, $Li_2S—P_2S_5$, and $Li_3PS_4$. A method of producing the solid electrolyte capable of being used in the lithium battery according to the embodiment of the invention is not particularly limited, and a solid electrolyte produced using a well-known production method can be appropriately used. In addition, the solid electrolyte may be amorphous or crystalline. The description of "$Li_2S—P_2S_5$" represents a sulfide solid electrolyte which is prepared using a raw material composition containing $Li_2S$ and $P_2S_5$. Regarding the other description, the same shall be applied.

In addition, in the positive electrode, a well-known binder which can be contained in the positive electrode of the lithium battery can be used. Examples of the binder include acrylonitrile-butadiene rubber (ABR), butadiene rubber (BR), polyvinylidene fluoride (PVdF), and styrene-butadiene rubber (SBR). Further, the positive electrode can contain a conductive additive which improves conductivity. Examples of the conductive additive which can be contained in the positive electrode include carbon materials such as vapor-grown carbon fiber, acetylene black (AB), Ketjen black (KB), carbon nanotube (CNT), and carbon nanofiber (CNF); and metal materials which can endure an environment in which a lithium battery is used. For example, when the positive electrode is prepared using the slurry-like positive electrode composition which is prepared by dispersing the positive electrode active material, the solid electrolyte, the conductive additive, the binder, and the like in a liquid, as the usable liquid, for example, heptane can be used, and a non-polar solvent can be preferably used. In addition, the thickness of the positive electrode is, for example, preferably 0.1 μm to 1 mm and more preferably 1 μm to 100 μm. In addition, the positive electrode can be prepared through a pressing step. In the embodiment of the invention, a pressure at which the positive electrode is pressed can be set to be about 100 MPa.

In addition, the negative electrode active material contained in the negative electrode can have, for example, a particle shape or a thin film shape. An average particle size ($D_{50}$) of the negative electrode active material is, for example, preferably 1 nm to 100 μm and more preferably 10 nm to 30 μm. In addition, the content of the negative electrode active material in the negative electrode is not particularly limited, but is, for example, preferably 40% to 99% by mass %.

In addition, in the negative electrode, optionally, a binder which binds the negative electrode active material and the solid electrolyte to each other can be used, in addition to the negative electrode active material and the solid electrolyte. Examples of such a binder include the above-described binders which can be contained in the positive electrode. Further, the negative electrode may contain a conductive additive which improves conductivity. Examples of the conductive additive which can be contained in the negative electrode include the above-described conductive additives which can be contained in the positive electrode. For example, when the negative electrode is prepared using the slurry-like negative electrode composition which is prepared by dispersing the negative electrode active material, the solid electrolyte, the conductive additive, the binder, and the like in a liquid, as the usable liquid, for example, heptane can be used, and a non-polar solvent can be preferably used. In addition, the thickness of the negative electrode is, for example, preferably 0.1 µm to 1 mm and more preferably 1 µm to 100 µm.

In addition, the negative electrode can be prepared through a pressing step. In the embodiment of the invention, a pressure at which the negative electrode is pressed is preferably 200 MPa or higher and more preferably about 400 MPa.

In addition, as the solid electrolyte which is contained in the solid electrolyte layer, a well-known solid electrolyte which can be used in an all-solid-state battery can be appropriately used. Examples of such a solid electrolyte include the above-described solid electrolytes which can be contained in the positive electrode or the negative electrode. In addition, the solid electrolyte layer can contain a binder which binds the solid electrolytes to each other from the viewpoint of, for example, exhibiting the plasticity thereof. Examples of such a binder include the above-described binders which can be contained in the positive electrode. However, in order to realize high output, the content of the binder in the solid electrolyte layer is preferably 5 mass % or less from the viewpoints of, for example, preventing excessive aggregation of the solid electrolyte and forming a solid electrolyte layer in which a solid electrolyte is uniformly dispersed. In addition, when the solid electrolyte layer is formed through a step of coating a substrate with a slurry-like solid electrolyte composition which is prepared by dispersing the solid electrolyte and the like in a liquid, as the liquid in which the solid electrolyte and the like are dispersed, for example, heptane can be used, and a non-polar solvent can be preferably used. The content of a solid electrolyte material in the solid electrolyte layer is, for example, preferably 60% or more, more preferably 70% or more, and still more preferably 80% or more by mass %. In addition, the thickness of the solid electrolyte layer varies depending on the configuration of a battery, but is, for example, preferably 0.1 µm to 1 mm and more preferably 1 µm to 100

In addition, as the negative electrode current collector and the positive electrode current collector, a well-known metal which can be used as a current collector of a lithium ion secondary battery can be used. Examples of such a metal include metal materials containing one or two or more elements selected from the group consisting of Cu, Ni, Al, V, Au, Pt, Mg, Fe, Ti, Co, Cr, Zn, Ge, and In.

In addition, although not illustrated, the all-solid-state battery according to the embodiment of the invention can be used in a state of being accommodated in a well-known battery case which can be used for an all-solid-state battery. Examples of such a battery case include a well-known laminated film case or a metal case.

In the above description, the all-solid-state battery 20 in which the active material powder 10 according to the embodiment of the invention is used in the positive electrode 21 has been described as an example. However, the all-solid-state battery according to the embodiment of the invention is not limited to the above-described configurations. The active material powder according to the embodiment of the invention may be used in either or both of the positive electrode and the negative electrode.

3. Method of Producing Active Material Powder

Figure 3:
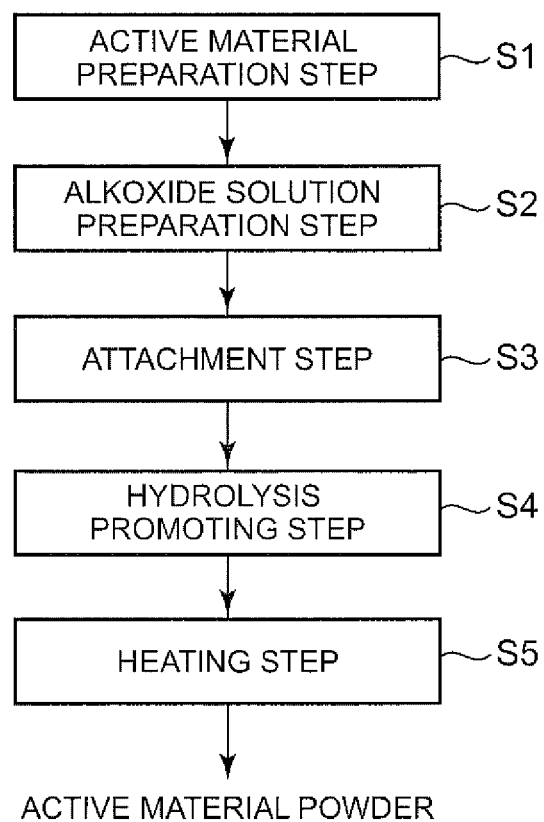
FIG. 3 is a diagram illustrating a method of producing an active material powder.

FIG. 3 is a diagram illustrating a method of producing an active material powder according to the embodiment of the invention. The method of manufacturing an active material powder illustrated in FIG. 3 includes an active material preparation step (S1), an alkoxide solution preparation step (S2), an attachment step (S3), a hydrolysis promoting step (S4), and a heating step (S5).

3.1. Active Material Preparation Step (S1)

In the active material preparation step (hereinafter, also referred to as "S1"), an active material particle having a surface to which an alkoxide solution is attached in the attachment step described below is prepared. The configuration of Si is not particularly limited as long as the active material particle can be prepared in this step. In S1, the active material particle may be produced or purchased for the preparation. In S1, the exemplary materials described in "1. Active Material Powder" can be prepared. The shape of the active material powder prepared in S1 may be the shape described in "1. Active Material Powder".

3.2. Alkoxide Solution Preparation Step (S2)

In the alkoxide solution preparation step (hereinafter, also referred to as "S2"), an alkoxide solution which is attached to the surface of the active material particle, prepared in S1, in the attachment step described below is prepared. The alkoxide solution prepared in S2 contains an alkoxide compound as a raw material of an ion-conducting oxide layer which is the coating layer formed on the surface of the active material particle. The alkoxide solution prepared in S2 is the sol-gel solution, that is, is converted into the sol state by the hydrolysis and polycondensation of the alkoxide compound and is further converted into the gel state by polycondensation and aggregation.

In the method of producing an active material powder according to the embodiment of the invention, the ion-conducting oxide formed on the surface of the active material powder is not particularly limited. For example, an oxide containing at least one element selected from elements in Groups 3 to 6 and Groups 13 to 15 as a raw element is preferable, and a lithium composite oxide containing lithium and at least one of the above elements as a raw element is particularly preferable. Specifically, an oxide containing at least one element from B, Si, Ti, Zr, V, P, Al, Nb, Ta, Cr, Mo, and W among the elements in Groups 3 to 6 and Groups 13 to 15 is preferable, and a lithium composite oxide containing lithium and at least one of the above elements is more preferable. More specifically, as the ion-conducting oxide, Li-containing oxides such as $LiNbO_3$, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$, and $Li_2WO_4$ are preferable. Among these, $LiNbO_3$ is more preferable.

In addition, the ion-conducting oxide may be a composite compound of Li-containing oxide. As the composite compound, an arbitrary combination of the above-described Li-containing oxides may be adopted, and examples thereof include $Li_3PO_4$—$Li_4SiO_4$, $Li_3BO_3$—$Li_4SiO_4$, and $Li_3PO_4$—$Li_4GeO_4$.

The alkoxide compound as the raw material of the ion-conducting oxide which is contained in the alkoxide solution prepared in S2 is not particularly limited as long as it is an alkoxide compound having elements constituting the ion-conducting oxide. When being represented by the formula $Li_xAO_y$, the ion-conducting oxide can be obtained by using an Li-supplying compound and an A-supplying compound as the alkoxide compound which is the raw material of the ion-conducting oxide. Examples of the Li-supplying compound include Li alkoxides such as lithium ethoxide and lithium methoxide, lithium acetate, and lithium hydroxide. In addition, examples of the A-supplying compound include alkoxides, acetates, and hydroxides containing A. Specifically, when the ion-conducting oxide contains Nb, examples of a Nb-supplying compound include Nb alkoxides such as niobium pentaethoxide, niobium pentamethoxide, niobium penta-i-propoxide, niobium penta-n-propoxide, niobium penta-i-butoxide, niobium penta-n-butoxide, and niobium penta-sec-butoxide; niobium acetate; and niobium hydroxide. It is preferable that the alkoxide compound which is the raw material of the ion-conducting oxide is dried.

In the alkoxide solution prepared in S2, a solvent can be used together with the above-described alkoxide compound. The solvent which can be used in S2 is not particularly limited as long as the above-described alkoxide compound can be dissolved or dispersed therein. It is preferable that the solvent is anhydrous or dehydrated alcohol because the deterioration of the active material can be more efficiently suppressed. Specifically, alcohols such as anhydrous or dehydrated ethanol, anhydrous or dehydrated methanol, anhydrous or dehydrated propanol, and anhydrous or dehydrated butanol can be used. The moisture content in the anhydrous or dehydrated alcohol solvent is not particularly limited, but is preferably 0.005 mass % or less, more preferably 0.0025 mass % or less, and still more preferably 0.00025 mass % or less.

In the alkoxide solution prepared in S2, the content of the alkoxide compound which is the raw material of the ion-conducting oxide can be appropriately set according to the composition of the coating layer formed on the surface of the active material particle. In addition, a method of preparing the alkoxide solution in S2 is not particularly limited. In addition, an atmosphere in which the alkoxide solution is prepared in S2 is not particularly limited, but is preferably an inert gas atmosphere. When the coating layer containing $LiNbO_3$ is formed on the surface of the active material particle, in S2, for example, lithium ethoxide powder is dissolved in dehydrated ethanol in an inert atmosphere, and then niobium pentaethoxide having a molar ratio (lithium: niobium) of 1:1 is added to this solution under stirring. As a result, an alkoxide solution containing lithium ions and niobium ions is prepared.

3.3. Attachment Step (S3)

In the attachment step (hereinafter, also referred to as "S3"), the alkoxide solution prepared in S2 is attached to the surface of the active material particle prepared in S1 by spraying the alkoxide solution thereto using a fluidized bed granulating-coating machine. Concurrently, the alkoxide solution attached to the surface of the active material particle is dried. Hereinafter, the fluidized bed granulating-coating machine is also referred to as a tumbling fluidized bed granulating-coating machine. As a result, a powder including an active material particle and a coating layer precursor attached to a surface of the active material particle is obtained. Due to the spraying in S3, the alkoxide solution is attached to the surface of the active material particle. Due to the drying in S3, volatile components such as a solvent, which are contained in the alkoxide solution attached to the surface of the active material particle, are removed. Hereinafter, a material which is attached to the surface of the active material particle after the drying in S3 will also be referred to as "coating layer precursor".

As described above, in order to reduce the unevenness in the thickness of the coating layer, it is efficient to rapidly dry the alkoxide solution attached to the surface of the active material particle. From this point of view, in S3, the intake-gas temperature of the tumbling fluidized bed granulating-coating machine is adjusted to be 100° C. or higher. As a result, since the drying rate of the alkoxide solution can be improved, the coating layer precursor in which the unevenness in thickness is reduced can be formed, and thus the coating layer in which the unevenness in thickness is reduced can be obtained in the heating step described below.

Examples of the tumbling fluidized bed granulating-coating machine which can be used in S3 include a Multiplex coater (manufactured by Powrex Corp.) and a flow coater (manufactured by Freund Corp.). In S3, when focusing on one active material particle, the alkoxide solution is dried immediately after the alkoxide solution is sprayed on the active material particle. Next, the spraying of the alkoxide solution on the active material particle and the drying of the alkoxide solution sprayed on the active material particle are repeated until the coating layer precursor attached to the surface of the active material particle has a target thickness. In addition, when focusing on plural active material particles present in the tumbling fluidized bed granulating-coating machine, active material particles on which the alkoxide solution is sprayed and active material particles on which the alkoxide solution is dried are present together. Accordingly, in S3, the alkoxide solution is attached to the active material particle. Concurrently, the alkoxide solution attached to the surface of the active material particle is dried. As a result, a powder in which the coating layer precursor is attached to the surface of the active material particle can be obtained. In S3, a dew point temperature in a container of the tumbling fluidized bed granulating-coating machine which performs the above-described spraying and drying is preferably -30° C. or lower from the viewpoint of preferably suppressing the deterioration of the active material particle.

During the spraying and drying in the tumbling fluidized bed granulating-coating machine, the active material particle is fluid. Therefore, typically, an air flow is generated in a fluidized bed container, and optionally, a rotor or the like is rotated. In S3, conditions of the air flow, rotating conditions of the rotor, and the like may be appropriately set and are not particularly limited. In addition, conditions of the spraying (coating) of the alkoxide solution are not particularly limited, and a spray rate and the like can be appropriately set.

In addition, in S3, the coating layer precursor is attached to the surface of the active material particle by spraying the alkoxide solution to the active material particle and, concurrently, drying the alkoxide solution on the surface of the active material particle.

As a result, even when the heating temperature is reduced in the heating step described below, the coating layer (ion-conducting oxide layer) can be formed on the surface of the active material particle.

3.4. Hydrolysis Promoting Step (S4)

In the hydrolysis promoting step (hereinafter, also referred to as "S4"), the powder obtained in S3 is exposed to a humidified inert gas atmosphere for four hours or longer. As a result, hydrolysis of the alkoxide compound, which is contained in the alkoxide solution attached to the surface of the active material particle, is promoted. Here, "humidified inert gas atmosphere" refers to a state where a dew point temperature of the inert gas filling the atmosphere to which the powder is exposed in the hydrolysis promoting step is higher than a dew point temperature of the air environment outside the environment in which the inert gas is filled. In S4, "the humidified inert gas atmosphere" can be easily formed by using the humidified inert gas.

In S4, the dew point temperature of the inert gas atmosphere can be adjusted to be 0° C. or higher from the viewpoint of sufficiently promoting the hydrolysis of the alkoxide compound to sufficiently improve the purity of the alkoxide compound contained in the coating layer precursor. The dew point is preferably 0° C. to 50° C. and more preferably 5° C. to 20° C.

Examples of the inert gas used in S4 include nitrogen gas, argon gas, and helium gas. By exposing the powder to the inert gas atmosphere, the deterioration of the coating layer due to oxygen and carbon dioxide can be suppressed. The concentration of impurities (gas components other than the inert gas and moisture) in the inert gas used in S4 is, for example, preferably 10000 ppm or lower and more preferably 1000 ppm or lower.

In S4, the time (exposure time) during which the powder is exposed to the inert gas atmosphere is adjusted to be four hours or longer from the viewpoint of sufficiently promoting the hydrolysis of the alkoxide compound to sufficiently improve the purity of the alkoxide compound contained in the coating layer precursor. The upper limit of the exposure time is not particularly limited and can be adjusted to be, for example, 36 hours or shorter.

3.5, Heating Step (S5)

In the heating step (hereinafter, also referred to as "S5") the coating layer is formed on the surface of the active material particle by heating the powder treated in S4. In other words, in S5, the coating layer precursor is converted into the coating layer by heating the powder treated in S4.

The heating temperature (heat treatment temperature) in S5 is not particularly limited as long as the target coating layer can be formed. From the viewpoint of adjusting the temperature so as to form the target coating layer, the heating temperature is preferably 300° C. or higher and more preferably 350° C. or higher. In addition, from the viewpoint of adjusting the temperature to suppress the deterioration of the active material, the heating temperature is preferably 500° C. or lower, more preferably 450° C. or lower, and still more preferably 400° C. or lower. That is, in S5, the heating temperature is, for example, preferably 300° C. to 500° C., more preferably 350° C. to 450° C., and still more preferably 350° C. to 400° C.

The atmosphere in S5 is not particularly limited as long as it contains oxygen so as to obtain the ion-conducting oxide. For example, S5 can be performed in air.

The heat treatment time in S5 is not particularly limited as long as the target coating layer can be formed. The heat treatment time is, for example, preferably 0.5 hours or longer, more preferably 0.5 hours to 48 hours, and still more preferably one hour to 20 hours.

In S5, a heat treatment method is not particularly limited as long as the heat treatment can be perfotmed in the above-described atmosphere. For example, a method using a firing furnace can be used. The firing furnace is not particularly limited as long as the heat treatment can be performed in the target atmosphere. For example, a muffle furnace can be preferably used.

4. Method of Manufacturing All-Solid-State Battery

Figure 4:
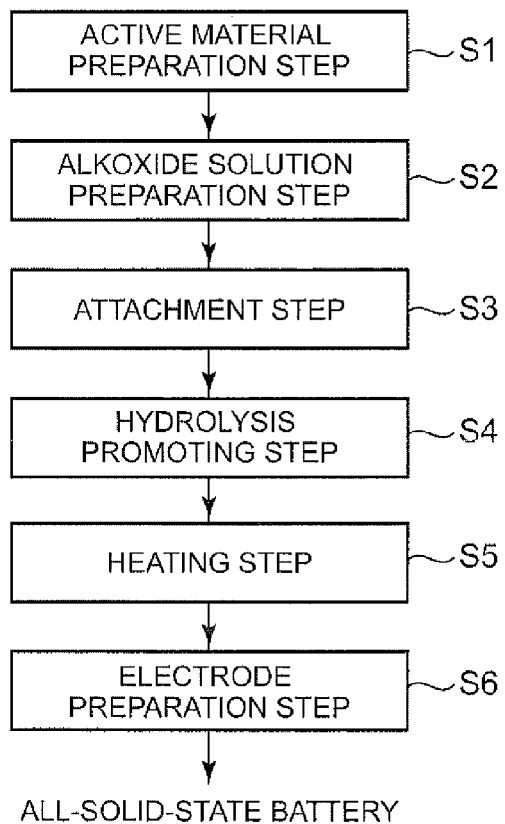
FIG. 4 is a diagram illustrating a method of manufacturing an all-solid-state battery.

FIG. 4 is a diagram illustrating a method of manufacturing an all-solid-state battery according to the embodiment of the invention. In FIG. 4, the same steps as the respective steps, which are described with reference to FIG. 3 illustrating the method of producing an active material powder according to the embodiment of the invention, are represented by the same reference numerals used in FIG. 3, and the description thereof will be appropriately omitted.

The method of manufacturing an all-solid-state battery according to the embodiment of the invention illustrated in FIG. 4 includes the active material preparation step (S1), the alkoxide solution preparation step (S2), the attachment step (S3), the hydrolysis promoting step (S4), the heating step (S5), and an electrode preparation step (S6). Since S1 to S5 have been described above in "3. Method of Producing Active Material Powder", the description thereof will be omitted.

In the electrode preparation step (hereinafter, also referred to as "S6"), a positive electrode or a negative electrode including the active material powder which is produced through S1 to S5 is prepared. For example, when the all-solid-state battery 20 illustrated in FIG. 2 is manufactured, a positive electrode 21 including an active material powder 10 is prepared in this step. The configuration of S6 is not particularly limited as long as a positive electrode or a negative electrode including the active material powder according to the embodiment of the invention can be prepared in this step. For example, when the positive electrode 21 is prepared in S6, the active material powder 10, the sulfide solid electrolyte 23a, the conductive additive 21a, and the binder 21b are mixed at a predetermined volume ratio, and this mixture is pressed at a predetermined pressure. Through these steps, the positive electrode 21 can be prepared.

In S6, once an electrode (a positive electrode or a negative electrode) including the active material powder according to the embodiment of the invention is manufactured, another electrode (a positive electrode or a negative electrode) which interposes an electrolyte with the above electrode is prepared. When another electrode (a negative electrode or a positive electrode) is prepared, the active material powder prepared through SI to S5 may be optionally used. Once a pair of electrodes (a positive electrode and a negative electrode) are prepared, an electrolyte is interposed between the positive electrode and the negative electrode. Through these steps, an all-solid-state battery according to the embodiment of the invention can be manufactured.

[Preparation of Sample]

EXAMPLE 1

(1) Preparation of Active Material

A positive electrode active material particle $LiNi_{1/3}Mn_{1/3}Co_{1/3}O_2$ (manufactured by Nicha Corporation) was prepared to attach a coating layer containing lithium niobate to a surface thereof.

(2) Preparation of Alkoxide Solution

Lithium ethoxide (manufactured by Kojundo Chemical Laboratory Co., Ltd.) was dissolved in dehydrated ethanol (manufactured by Wako Pure Chemical Industries Ltd.) to be uniformly dispersed therein, and then niobium pentaethoxide (manufactured by Kojundo Chemical Laboratory Co., Ltd) having a molar ratio (lithium:niobium) of 1:1 was added to this solution, followed by stirring until the elements were uniformly mixed. As a result, an alkoxide solution containing lithium ions and niobium ions was prepared. Here, the amount of lithium ethoxide added was adjusted such that the solid content ratio of the alkoxide solution was 6.9 mass %.

(3) Attachment 476 g of the alkoxide solution prepared in (2) was sprayed on 1 kg of the positive electrode active material particle prepared in (1) using a tumbling fluidized bed granulating-coating machine (MP-01, manufactured by Powrex Corp.), and concurrently, the alkoxide solution was dried. As a result, a powder including the positive electrode active material particle and a coating layer precursor, which was attached to a surface of the positive electrode active material particle, was obtained. Operation conditions of the tumbling fluidized bed granulating-coating machine were as follows.
Intake gas: nitrogen
Intake-gas temperature: 100° C.
Intake gas flow rate: 0.3 m$^3$/h
Rotor speed: 300 rotations per minute
Spray rate: 1.5 g/min
(4) Hydrolysis Promotion The powder prepared in (3) was exposed to a humidified nitrogen gas atmosphere (pure nitrogen gas; dew point temperature: 18° C., impurity concentration: 59 ppm or lower) for four hours to promote hydrolysis.
(5) Firing The powder obtained in (4) was heated in air at 350° C. for five hours. As a result, an active material powder (active material powder of Example 1) including the positive electrode active material particle (LiNi$_{1/3}$Mn$_{1/3}$Co$_{1/3}$O$_2$) and the coating layer containing LiNbO$_3$, which was attached to the surface of the positive electrode active material particle, was prepared.
(6) Preparation of All-Solid-State Battery The obtained active material powder of Example 1 and a sulfide solid electrolyte (Li$_3$PS$_4$) were weighed at a volume ratio (active material powder:sulfide solid electrolyte) of 6:4 and were put into a container containing heptane. Further, 3 mass % (with respect to a slurry-like positive electrode composition to be prepared) of a conductive additive (vapor-grown carbon fiber, manufactured by Showa Denko K.K.) and 0.7 mass % (with respect to a slurry-like positive electrode composition to be prepared) of a binder (butylene rubber, manufactured by JSR Corporation) were put into the container containing heptane and the like. As a result, a slurry-like positive electrode composition was prepared. The prepared slurry-like positive electrode composition was dispersed with a ultrasonic homogenizer, was coated on aluminum foil, and was dried under conditions of 100° C. and 30 minutes. Next, the aluminum foil was punched into a size of 1 cm$^2$ to prepare a positive side electrode. On the other hand, a negative electrode active material (layered carbon) and the sulfide solid electrolyte material were weighed at a volume ratio (negative electrode active material:sulfide solid electrolyte) of 6:4 and were put into a container containing heptane. Further, 1.2 mass % (with respect to a slurry-like negative electrode composition to be prepared) of a binder (butylene rubber, manufactured by JSR Corporation) was put into the container containing heptane, the negative electrode active material, and the like. As a result, a slurry-like negative electrode composition was prepared. The prepared slurry-like negative electrode composition was dispersed with a ultrasonic homogenizer, was coated on copper foil, and was dried under conditions of 100° C. and 30 minutes. Next, the aluminum foil was punched into a size of 1 cm$^2$ to prepare a negative side electrode. Next, 64.8 mg of a sulfide solid electrolyte (Li$_3$PS$_4$) was put into a cylindrical ceramic having a 1 cm$^2$-sized inner diameter cross-section, and the surface thereof was pressed at 98 MPa to be flat. As a result, a separator layer was formed. Next, the positive electrode and the negative electrode were put into the cylindrical ceramic such that the separator layer was interposed between the positive electrode and the negative electrode, followed by pressing at 421.4 MPa for 1 minute.

Stainless steel rods were put into the positive electrode side and the negative electrode side to restrict the electrodes at 98 MPa. As a result, an all-solid-state battery of Example 1 was prepared.

EXAMPLE 2

Under the same conditions as those of Example 1 except that the powder was exposed to the humidified nitrogen gas atmosphere for six hours in the hydrolysis promoting treatment during the preparation of the active material powder, an active material powder (active material powder of Example 2) including LiNi$_{1/3}$Mn$_{1/3}$Co$_{1/3}$O$_2$ and the coating layer containing LiNbO$_3$, which was attached to the surface of LiNi$_{1/3}$Mn$_{1/3}$Co$_{1/3}$O$_2$, was prepared. Further, under the same conditions as those of Example 1 except that the active material powder of Example 2 was used instead of the active material powder of Example 1, an all-solid-state battery (all-solid-state battery of Example 2) was prepared.

EXAMPLE 3

Under the same conditions as those of Example 1 except that the powder was exposed to the humidified nitrogen gas atmosphere for eight hours in the hydrolysis promoting treatment during the preparation of the active material powder, an active material powder (active material powder of Example 3) including LiNi$_{1/3}$Mn$_{1/3}$Co$_{1/3}$O$_2$ and the coating layer containing LiNbO$_3$, which was attached to the surface of LiNi$_{1/3}$Mn$_{1/3}$Co$_{1/3}$O$_2$, was prepared. Further, under the same conditions as those of Example 1 except that the active material powder of Example 3 was used instead of the active material powder of Example 1, an all-solid-state battery (all-solid-state battery of Example 3) was prepared.

COMPARATIVE EXAMPLE 1

Under the same conditions as those of Example 1 except that the heat treatment was performed in air at 350° C. for five hours without performing the hydrolysis promoting treatment during the preparation of the active material powder, an active material powder (active material powder of Comparative Example 1) including LiNi$_{1/3}$Mn$_{1/3}$Co$_{1/3}$O$_2$ and the coating layer containing LiNbO$_3$, which was attached to the surface of LiNi$_{1/3}$Mn$_{1/3}$Co$_{1/3}$O$_2$, was prepared. Further, under the same conditions as those of Example 1 except that the active material powder of Comparative Example 1 was used instead of the active material powder of Example 1, an all-solid-state battery (all-solid-state battery of Comparative Example 1) was prepared.

COMPARATIVE EXAMPLE 2

Under the same conditions as those of Example 1 except that the powder was exposed to the humidified nitrogen gas atmosphere for two hours in the hydrolysis promoting treatment during the preparation of the active material powder, an active material powder (active material powder of Comparative Example 2) including LiNi$_{1/3}$Mn$_{1/3}$Co$_{1/3}$O$_2$ and the coating layer containing LiNbO$_3$, which was attached to the surface of LiNi$_{1/3}$Mn$_{1/3}$Co$_{1/3}$O$_2$, was prepared. Further, under the same conditions as those of Example 1 except that the active material powder of Comparative Example 2 was used instead of the active material powder of Example 1, an all-solid-state battery (all-solid-state battery of Comparative Example 2) was prepared.

COMPARATIVE EXAMPLE 3

Under the same conditions as those of Example 1 except that the intake-gas temperature of the tumbling fluidized bed granulating-coating machine was changed to 80° C. during the preparation of the active material powder, an active material powder (active material powder of Comparative Example 3) including LiNi$_{1/3}$Mn$_{1/3}$Co$_{1/3}$O$_2$ and the coating layer containing LiNbO$_3$, which was attached to the surface of LiNi$_{1/3}$Mn$_{1/3}$Co$_{1/3}$O$_2$, was prepared. Further, under the same conditions as those of Example 1 except that the active material powder of Comparative Example 3 was used instead of the active material powder of Example 1, an all-solid-state battery (all-solid-state battery of Comparative Example 3) was prepared.

[Measurement of Pore Size Distribution]

The active material powders of Examples 1 to 3 and Comparative Examples 1 to 2 prepared using the above-described methods were weighed in amounts of 5 g each. The active material powder was evacuated under conditions of 120° C. and five hours and was measured using the nitrogen gas adsorption method. Next, using the BJH method, a pore size distribution in a region of pores having a diameter of 2 nm to 200 nm was obtained. Based on this pore size distribution, a total volume V1 of pores having a diameter of 2 nm to 7 nm and a total volume V2 of pores having a diameter of 2 nrn to 200 nm were obtained to calculate V1/V2. After being rounded off to three decimal places, the V1/V2 value is shown in Table 1.

[Measurement of Variation in Thickness of Coating Layer]

Figure 5:
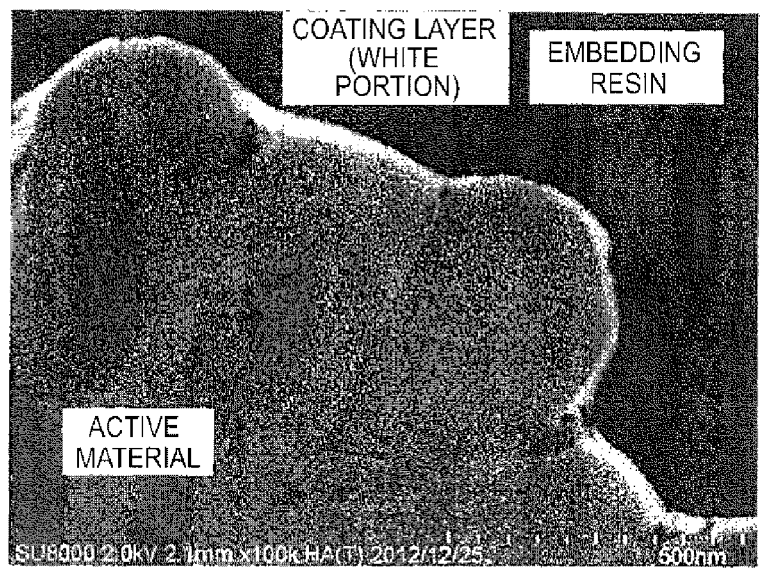
FIG. 5 is a diagram illustrating a cross-section of an active material powder of Example 1.
Figure 6:
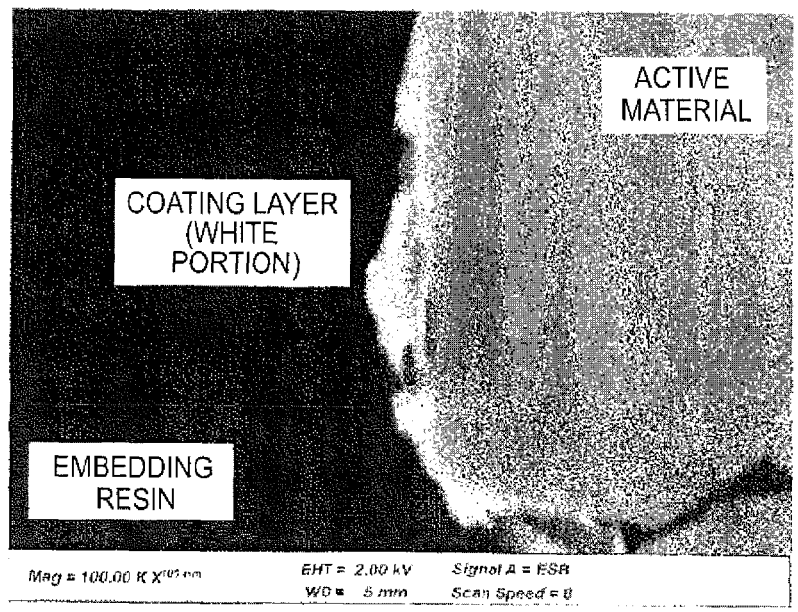
FIG. 6 is a diagram illustrating a cross-section of an active material powder of Comparative Example 3.

Each of the active material powders of Example 1 and Comparative Example 3 prepared using the above-described methods were embedded with an epoxy resin, followed by a treatment with a cross-section polisher. Next, a cross-section of the coating layer was observed using a field emission scanning electron microscope (SU8000, manufactured by Hitachi High-Technologies Corporation) to measure the thickness of the coating layer. Regarding measurement positions of the thickness, the circumference of the cross-section of the active material was divided into 8 areas, and the thickness of the coating layer of each active material particle was measured at the 8 positions. Five arbitrary particles (regarding the active material powder of Example 1 and the active material powder of Comparative Example 3) were measured using the same method as described above. The average thickness and standard deviation of the coating layer were calculated from the measurement results at 40 points in total. Using the calculated average thickness and standard deviation, a variation coefficient (standard deviation divided by average thickness) was calculated as an index indicating a variation in thickness. Table 2 shows the results of active material powder of Example 1, and Table 3 shows the results of the active material powder of Comparative Example 3. In Tables 2 and 3, the unit of the numerical values is "nm". When calculated from the results shown in Table 2, the average thickness of the coating layer was 26.44 nm, the standard deviation was 6.26 nm, the variance was 39.23 nm$^2$, and the variation coefficient was 0.24. In addition, when calculated from the results shown in Table 3, the average thickness of the coating layer was 45.05 nm, the standard deviation was 40.83 nm, the variance was 1667.27 nm$^2$, and the variation coefficient was 0.91. In addition, FIG. 5 is a field emission scanning electron microscopic image illustrating the active material powder of Example 1, and FIG.6 is a field emission scanning electron microscopic image illustrating the active material powder of Comparative Example 3. Here, when a sample was prepared to measure the variation in the thickness of the coating layer, a cross-section polisher was used. However, the embedding sample may be treated using another device having a function of polishing a cross-section of a sample (for example, a focused ion beam (FIB) device). When a focused ion beam is used, for example, the embedding sample may be attached to a plate for FIB processing and then may be observed using a transmission electron microscope (TEM).

[Measurement of Reaction Resistance of All-Solid-State Battery]

Figure 7:
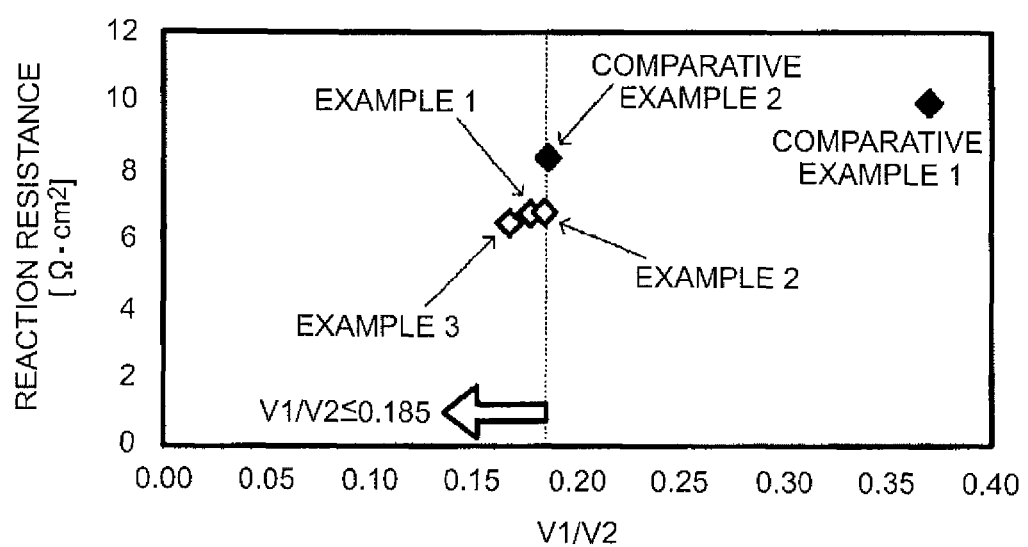
FIG. 7 is a diagram illustrating a relationship between the reaction resistance and V1/V2.

Each of the all-solid-state batteries of Examples 1 to 3 and Comparative Examples 1 to 3 prepared using the above-described methods was charged to a voltage of 4.55 V and was discharged to a voltage of 2.5 V. Next, the reaction resistance of each all-solid-state battery at 3.6 V was measured using the AC impedance method. The reaction resistance ($\Omega \cdot cm^2$) of each all-solid-state battery was specified from an arc obtained from a Nyquist plot. After being rounded off to two decimal places, the reaction resistance values of Examples 1 to 3 and Comparative Examples 1 and 2 are shown in Table 1. In addition, FIG. 7 illustrates a relationship between the reaction resistance and V1/V2. The reaction resistance of the all-solid-state battery of Comparative Example 3 (value obtained after being rounded off to one decimal place) was 12.9 $\Omega \cdot cm^2$.

TABLE 1

|  | Hydrolysis Promotion Time (h) | V1/V2 | Reaction Resistance ($\Omega \cdot cm^2$) |
|---|---|---|---|
| Example 1 | 4 | 0.177 | 6.76 |
| Example 2 | 6 | 0.184 | 6.80 |
| Example 3 | 8 | 0.167 | 6.49 |
| Comparative Example 1 | 0 | 0.370 | 9.96 |
| Comparative Example 2 | 2 | 0.186 | 8.37 |

TABLE 2

|  | Particle 1 | Particle 2 | Particle 3 | Particle 4 | Particle 5 |
|---|---|---|---|---|---|
| Measurement Position 1 | 23.72 | 27.95 | 32.59 | 31.62 | 31.87 |
| Measurement Position 2 | 35.57 | 21.29 | 24.04 | 41.27 | 35.57 |
| Measurement Position 3 | 16.77 | 25.31 | 35.35 | 28.5 | 20.15 |
| Measurement Position 4 | 32.59 | 23.05 | 21.28 | 34 | 23.05 |
| Measurement Position 5 | 30.1 | 27.67 | 17.68 | 17.68 | 25 |
| Measurement Position 6 | 33.54 | 25 | 19.76 | 15.81 | 25.31 |
| Measurement Position 7 | 21.29 | 23.05 | 27.95 | 28.5 | 15.81 |
| Measurement Position 8 | 20.15 | 31.87 | 28.77 | 25.31 | 31.87 |

TABLE 3

|  | Particle 1 | Particle 2 | Particle 3 | Particle 4 | Particle 5 |
|---|---|---|---|---|---|
| Measurement Position 1 | 51.2 | 99.71 | 14.81 | 46.4 | 18.88 |
| Measurement Position 2 | 5.553 | 7.406 | 37.77 | 61.3 | 55.55 |
| Measurement Position 3 | 44.77 | 39.36 | 43.35 | 16.56 | 35.13 |
| Measurement Position 4 | 38.87 | 116.3 | 18.89 | 18.52 | 52.37 |
| Measurement Position 5 | 47.45 | 8.28 | 51.59 | 71.13 | 226 |
| Measurement Position 6 | 16.66 | 21.59 | 38.67 | 15.27 | 23.71 |
| Measurement Position 7 | 45.79 | 85.89 | 15.27 | 55.05 | 13.35 |
| Measurement Position 8 | 5.553 | 111.4 | 18.89 | 80.88 | 26.7 |

As shown in Table 1 and FIG. 7, in the all-solid-state batteries (all-solid-state batteries of Examples 1 to 3) using the active material powders of Examples 1 to 3 in which V1/V2 was 0.185 or less, the reaction resistance was 6.80 Ω·cm² or lower. On the other hand, in the all-solid-state batteries (all-solid-state batteries of Comparative Examples 1 and 2) using the active material powders of Comparative Examples 1 and 2 in which V1/V2 was more than 0.185, the reaction resistance was 8.37 Ω·cm² or lower. The value 6.80 Ω·cm² was lower than the value 8.37 Ω·cm² by 20%. It was verified from the result that, according to the embodiment of the invention, an active material powder capable of reducing the resistance and a method of producing the same can be provided.

In addition, in the active material powder of Example 1 in which V1/V2 was 0.185 or less, the variation coefficient was 0.24. On the other hand, in the active material powder of Comparative Example 3 in which the intake-gas temperature was 80° C., the variation coefficient was 0.91. The variation coefficient value being low represents the unevenness in the thickness of the coating layer being small. Therefore, it was verified from the result that, according to the embodiment of the invention, an active material powder capable of reducing the unevenness in the thickness of the coating layer and a method of producing the same can be provided. In the all-solid-state battery of Comparative Example 3 using the active material powder of Comparative Example 3, the reaction resistance was 12.9 Ω·cm². Therefore, the reaction resistance of the all-solid-state battery was able to be reduced to substantially half by increasing the intake-gas temperature from 80° C. to 100° C.

What is claimed is:

1. An active material powder comprising:
    an active material particle; and
    a coating layer that is attached to a surface of the active material particle, contains $LiNbO_3$, and has pores, wherein
    when a total volume of pores having a diameter of 2 nm to 7 nm among the pores is represented by V1, and when a total volume of pores having a diameter of 2 nm to 200 nm among the pores is represented by V2, V1/V2 is 0.185 or less.

2. The active material powder according to claim 1, wherein a coverage of the coating layer on the surface of the active material particle is 50% or higher.

3. A method of producing an active material powder comprising:
    obtaining a powder including an active material particle and a coating layer precursor attached to a surface of the active material particle by attaching an alkoxide solution to the surface of the active material particle and by concurrently drying the alkoxide solution attached to the surface of the active material particle with a fluidized bed granulating-coating machine, the alkoxide solution containing an alkoxide compound;
    promoting hydrolysis of the alkoxide compound by exposing the powder to a humidified inert gas atmosphere; and
    forming a coating layer on the surface of the active material particle by heating the powder after the promotion of the hydrolysis, wherein
    an intake-gas temperature of the fluidized bed granulating-coating machine is 100° C. or higher,
    a time during which the powder is exposed to the humidified inert gas atmosphere is four hours or longer, and
    when a total volume of pores having a diameter of 2 nm to 7 nm among the pores is represented b V1, and when a total volume of pores having a diameter of 2 nm to 200 nm among the pores is represented by V2, V1/V2 is 0.185 or less.

4. The method according to claim 3, wherein the alkoxide solution is a sol-gel solution.

* * * * *